United States Patent Office 2,903,446
Patented Sept. 8, 1959

2,903,446

MONOACYL DERIVATIVES OF SUBSTITUTED CARBAMIDES AND PROCESS OF PREPARATION

Lloyd I. Osipow, Monsey, and William C. York, Westbury, N.Y., assignors to W. R. Grace & Co., a corporation of Connecticut No Drawing. Application June 5, 1957
Serial No. 663,621

20 Claims. (Cl. 260—211.5)

This invention relates to monoacyl derivatives of substituted carbamides and a process for preparing the same. In one specific aspect, it relates to a novel method for preparing fatty acid monoesters of N-urea glucoside. In another aspect, it relates to the new chemical compounds obtained by this method.

N-urea glucoside is well known. A satisfactory procedure for preparing this interesting and useful compound is reported in British Patent No. 653,775 (1951). See also Rec. Trav. Chim., 19, 399 (1900), Rec. Trav. Chim., 22, 31 (1903), Ber. 59, 69 (1926), and Biochemical J., 20, 195 (1926). N-urea glucoside has been reported to form condensation products with aldehydes in the presence of cellulose or paper to render these materials crease proof and wrinkle proof. It also has been used for treating paper or cardboard to make it moisture resistant. The pentaacetate and the tetrabenzoate have been reported in Ber., 59, 69 (1926). None of these known compounds exhibits surface activity or foaming and deterging properties.

Certain long chain substituted ureas have been reported to be useful in formulating detergent compositions. Ross, in U.S. Patent No. 2,708,183, points out that long chain higher alkyl urea derivatives enhance the detergency of anionic sulfated and sulfonated materials in the presence of builders. Unfortunately, the widespread use of the urea derivatives described by Ross is limited, since such derivatives by themselves have poor foaming and deterging properties and are valueless as cleaning agents per se. Urea adducts of polyolesters, particularly urea glycerides, have been reported by Weitkamp in U.S. Patent No. 2,727,025 to have germicidal and fungicidal properties. While it is apparent that various fatty acid urea derivatives have been heretofore prepared, so far as is known none of these compounds per se is a good detergent. We have discovered certain novel monoesters of N-urea glucoside which are not subject to these limitations. Our new compositions are surface active and have excellent detergent properties.

It is, therefore, an object of the present invention to provide a new generic class of chemical compounds the members of which are useful as low-foaming detergents, emulsificants and foam stabilizers. It is a further object to provide a novel method for preparing these compounds.

According to the present invention, we have discovered a new class of chemical compounds characterized by the structural formula:

$$\begin{array}{c}
\quad\text{H}\ \text{H}\ \text{O}\\
\quad|\ \ |\ \ \|\\
\overline{\quad\ }\text{C}-\text{N}-\text{C}-\text{NH}_2\\
|\ \ \text{H}-\text{C}-\text{OH}\\
\text{O}\ \ \text{HO}\cdot\text{C}-\text{H}\\
|\ \ \text{H}-\text{C}-\text{OH}\\
\underline{\quad\ }\text{CH}\\
\quad\text{H}_2\text{C}-\text{O}-\text{C}-\text{R}\\
\quad\qquad\qquad\ \|\\
\quad\qquad\qquad\ \text{O}
\end{array}$$

In the above formula, R is a hydrocarbon residue of the formula $C_nH_m$ where $n$ is an integer of at least 7 and not more than 23 and $m$ is an integer in the range between $2n-3$ and $2n+1$ inclusive. Thus, R is an alkyl, alkenyl, alkadienyl radical having from 7 to 23 carbon atoms. To confirm the position of the acyl moiety a pure sample of N-urea glucoside monolaurate (obtained from the chromatographic procedure described in the specification infra) was subjected to periodate oxidation. The procedure described in our copending patent application S.N. 663,580, filed June 5, 1957 was employed. Assay for periodate after completion of the oxidation showed that 1.9787 millimoles of periodate were consumed per millimole of ester. The theoretical value for periodate consumption, with the lauroyl group in the 6 position, is 2.0. Formic acid produced corresponded to 0.659 millimole per millimole of ester. The theoretical value, corresponding to the lauroyl group in the 6 position, is 1.0. However, under these reaction conditions a portion of the formic acid is converted to ester and results are commonly low. It was concluded from these studies that the lauroyl moiety is predominantly in the 6 position of glucose.

Generically, our new compounds are described as the monofatty acid esters of N-urea glucoside. Typical novel N-urea glucoside esters embraced by the present invention include the caprylate, pelargonate, caprate, undecanoate, laurate, tridecanoate, myristate, pentadecanoate, palmitate, margarate, stearate, nondecanoate, arachidate, heneicosanoate, behenate, tricosanoate, lignocerate, oleate, palmitoleate, petroselinate, erucate, linoleate, eleosterate, and the like. Suitable esters also include mixtures of those enumerated hereabove. For example, the N-urea glucoside esters of coconut oil, palm oil, tall oil, olive oil, soybean oil and tung oil are also useful.

Our novel compounds are prepared by a new alcoholysis reaction between N-urea glucoside and an ester of a fatty acid of the general formula:

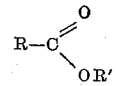

R has the meaning hereinbefore described. R' is an organic moiety. In a preferred embodiment, R' is a lower alkyl radical; i.e., up to and including hexyl. The lower alkyl esters of the fatty moieties of the above formula are suitable for the alcoholysis reaction, since they result in the formation of an alcohol sufficiently volatile to permit its removal from the reaction mixture by simple distillation as the reaction progresses. Since alcoholysis is an equilibrium reaction, it follows that some N-urea glucoside monoester is formed whether or not the by-product alcohol is separated. Thus, any organic ester of a fatty acid is suitable in the present process including those such as glycerides which are less volatile than the solvent selected for the reaction medium. However, if the alcohol is not volatile, the reaction will proceed only until equilibrium conditions are established. The novel reaction is shown below in Equation 1.

(1) 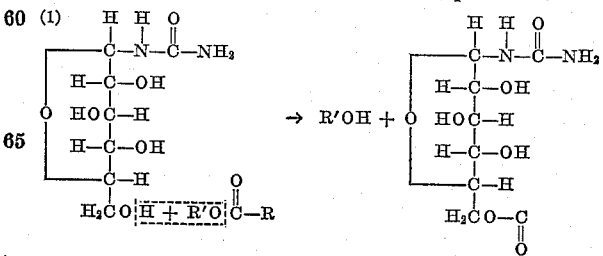

From the above equation, it is evident that the equilibrium will shift to the right if the alcohol is removed as it is formed. Thus, in the preferred feature of our invention using a volatile alcohol, the reaction can be driven to completion by stripping the product alcohol from the system by vaporization or distillation. The impediment to rapid reaction is the removal of the alcohol. Consequently, the reaction is faster if a more volatile alcohol is used. Under the preferred conditions of temperature and pressure, the alcohol can be conveniently stripped free of the reaction mixture by using reduced pressure to aid distillation of the alcohol therefrom or by blowing an inert gas through or over the surface of the reaction mixture. Furthermore, it is well known that a large free area will favor stripping of the product alcohol. A number of different types of film evaporators are commercially available, and these can be used with vacuum or an inert gas.

Suitable solvents for the novel alcoholysis reaction are those which will dissolve both N-urea glucoside and the starting ester without preferential reaction with either of the products or the reactants. In the preferred embodimen, we use dimethylsulfoxide, formamide or mono-ethylformamide.

The novel reaction is effectively catalyzed by an alkaline catalyst. By the term "alkaline catalyst" we mean a basic organic salt or a salt of a metal selected from groups I, II or IV of the periodic table and a weak acid. Proton-accepting metals such as tin and zinc are also embraced by the term "alkaline catalyst." Likewise, quaternary ammonium bases and similar compounds are effective for this purpose. Exemplary catalysts include sodium hydroxide, potassium hydroxide, sodium carbonate, sodium methoxide, potassium ethoxide, trisodium phosphate, lithium hydroxide, magnesium hydroxide and lead oxide. Alkali metal hydroxides, alcoholates, carbonates and phosphates are the preferred catalysts. The corresponding alkaline earth compounds are also suitable.

The general procedure for preparing the monofatty esters of N-urea glucoside is as follows: A quantity of N-urea glucoside is admixed with a lower alkyl ester of a fatty acid in mutual solvent. We have already indicated that sulfoxides e.g., dimethylsulfoxide, are preferred solvents. The resulting solution may be placed in a container equipped with a vacuum sealed stirrer and a fractionating column. The solution is then heated, preferably to a temperature of about 60–95° C. under a reduced pressure of about 5 to 50 mm. Hg absolute for one hour to remove the major portion of any moisture that may be present. A quantity of catalyst (preferably moisture free) is added to this solution and the temperature thereof is maintained at about 60–95° C. under an absolute pressure of about 5–50 mm. Hg. During the reaction some of the solvent is distilled off along with most of the by-product alcohol formed by the alcoholysis reaction. If desired, the reaction may be stopped at a convenient time to replace the amount of solvent which has been distilled off. With an efficient fractionating column, the solvent will be returned automatically to the reaction mixture, thus obviating such a step.

While the time of the reaction is not particularly critical, we find it preferable to let it continue from 1 to 12 hours. Actually, some product is formed in a few minutes at the preferred temperature range. The required reaction time will depend upon the reaction temperature and the efficiency with which the product alcohol is stripped from the system. When the reaction is carried out under preferred conditions, e.g. with methyl esters at 95° C. and potassium carbonate catalysts, from 1 to 5 hours is generally adequate for complete conversion into the novel N-urea glucoside ester.

After the reaction is stopped the catalyst can be neutralized with any acid. Acetic acid is effective for this purpose. While the neutralization step is not a necessary feature in obtaining our novel products, the purity of such products can be enhanced by converting the soap, which is invariably formed in the reaction, to fatty acids by neutralization. The fatty acids are subsequently extracted from the reaction mixture using standard laboratory techniques. Purification methods will be discussed in greater detail infra.

The entire reaction is preferably carried out under anhydrous conditions, since we have found that the presence of several percent of water may result in reduced yields. A slight amount of moisture is not excessively deleterious, since moisture initially present in such quantities is rapidly removed by distillation. In effect, the reacton is carried out under substantially anhydrous conditions.

The quantity of catalyst required to effectively promote our novel reaction is in the range of 0.05–0.30 mole per mole of starting ester. In the preferred embodiment about 0.15 mole of catalyst are used. High levels of catalyst produce excessive amounts of soap which in turn decreases the purity of the ultimate product. Using low levels, the alcoholysis reaction is slowed considerably.

The effective mole ratio of N-urea glucoside to fatty acid ester for obtaining our novel compounds in good yield is generally about 3 to 1; however, such a mole ratio is not absolutely critical and some degree of variation may be tolerated. If the mole ratio of N-urea glucoside to fatty acid ester is less than about 3 to 1, more highly substituted esters of N-urea glucoside are also formed. However, lower ratios of N-urea glucoside to fatty acid ester may be employed and the resulting mixture of mono or higher acyl derivatives can be subsequently separated.

Our novel alcoholysis reaction can be carried out over a wide temperature range. We have previously indicated that the reaction rate is more rapid at elevated temperatures. However, degradation of the N-urea glucoside and discoloration of the ultimate product is more pronounced as the temperature of the system is increased. Consequently, we prefer to carry out the reaction in the range of about 60–95° C. The volatility of the alcohol formed during the reaction is an important criterion for choosing an operating temperature within the preferred range.

We have mentioned that stripping alcohol from the system is facilitated by using a reduced pressure. We have found, as a matter of practice, that a reduced pressure of about 5 to 10 mm. Hg absolute represents a preferred range. However, a greater range of pressures of less than atmospheric is operable.

The novel products are obtained from the solvent as crude crystalline masses. They may be used as such or they may be further purified by various procedures readily apparent to those skilled in the art. On a commercial scale, several methods of purification are feasible. If the reaction is carried out using a substantial excess of N-urea glucoside (to avoid formation of multi-substituted esters), the preferred purification technique is as follows: At the completion of the reaction, the mixture is neutralized to convert soap to fatty acids. The solution, in dimethylsulfoxide, formamide or dimethylformamide, is then extracted with an aliphatic hydrocarbon solvent, such as hexane or heptane, to remove free fatty acids and unreacted ester. A water-immisicible solvent such as n-butanol is then added to the solution, which is then solvent extracted with an aqueous sodium chloride solution to remove the reaction solvent, unreacted N-urea glucoside, and other water-soluble impurities. The butanol solution is then carbon treated to remove color, and distilled. A steam distillation will remove the last traces of butanol. If more highly substituted esters of N-urea glucoside are present in the reaction mixture, the hexane treatment is preferably omitted. The reaction mixture is neutralized, partitioned between n-butanol and salt solution, washed further with salt solution, and the solvents removed by distillation. The monoester can then be recovered by precipitation from any one of a number of polar solvents, such as acetone or methanol.

A pure sample may be obtained conveniently by adsorption chromatography. A chromatographic column may be prepared by packing a quantity of a mixture containing 3 parts by weight Florex XXX (hydrated sodium aluminum silicate of the fuller's earth type) and 1 part by weight of Celite 545 (diatomaceous earth) into a glass tube to give a long adsorbent column that is small in diameter. A portion of the sample to be chromatographed is dissolved in a solvent mixture composed of equal parts of methanol and benzene. The column is pre-wetted with this same solvent mixture and then the solution containing the sample is added to the top of the column. After this solution has flowed below the top level of the column, fresh solvent is added and the column is eluted with a quantity of the solvent mixture (benzene-methanol, 1:1). Fractions are collected at the bottom of the column and evaporated to dryness. Usually, about 5 of the fractions collected contain the major portion of the sample. The central fraction is generally considered to be the purest of the 5 fractions; this fraction may be characterized by determining its melting point, specific rotation, and chemical composition.

In view of the established properties of reported urea derivatives, it is completely unobvious that the physical and chemical characteristics of our novel compounds would make them useful both as built and unbuilt detergents. A brief discussion of detergency, specifically related to the properties of the N-urea glucoside monoesters, is appropriate at this point. The unsymmetrical nature of the N-urea glucoside monofatty ester molecule is largely responsible for its effectiveness as a nonionic detergent. The acyl moiety depending, of course, upon its length is more or less hydrophobic or water repelling. The hydroxyl groups, on the other hand, are hydrophilic or water attracting. When one of our novel chemical compounds is dissolved in water the hydrophobic portion of the molecule becomes positively adsorbed, or oriented outward from the surface of the water. The hydroxyl groups, however, tend to become drawn into the water. The concentration of the hydrophobic portions of the molecule in the water surface leaves fewer water molecules in the surface to be attracted by the water molecules of the interior. This concentration of hydrophobic groups in the surface particularly favors the lowering of the surface tension of the solution. Thus, the tendency of our novel unsymmetrical molecules to become oriented in solution with their acyl moiety extending outward from the liquid surface has an important effect upon surface activity and detergency. This effect establishes the lower limit of the required number of carbon atoms contained by the acyl moiety to produce an effective surfactant. For example, if for our purposes we selected as a urea derivative one containing a highly water-soluble organic acid group such as an acetate group, the hydrocarbon end of the molecule would not be sufficiently water repellent to prevent the polar group from pulling the hydrocarbon end entirely into the water phase. Without the necessary concentrating of fatty moieties in the surface of the solution, there is no pronounced effect on surface tension, and hence no surface activity. We have found that an acyl moiety of at least 8 carbon atoms is of sufficient length to have the desired effect on surface tension. Our upper limitation of 24 carbon atoms in the acyl moiety is predicated largely upon solubility. As the length of a hydrocarbon chain increases there is a measurable decrease in solubility. The presence of unsaturation in such a chain has a mitigating effect upon such a decrease. However, N-urea glucoside monoesters having acyl moieties of more than 24 carbon atoms would not be sufficiently soluble to be effective as detergents, or as additives in detergent compositions.

The presence of a detergent in a solution effectively reduces the interfacial tension at liquid-liquid or liquid-solid interfaces as well as the surface tension. Generally speaking, detergents of increased molecular weight effect a reduction in the concentration necessary to obtain the minimum interfacial tension and a reduction in value of the interfacial tension at its minimum.

Not all surfactants are good detergents. In order for a surfactant to be an excellent detergent it must have (1) ability to wet and spread on liquid and solid surfaces, (2) ability to form a low and stable foam, (3) ability to emulsify oily materials, (4) ability to peptize aggregates of solid particles and (5) ability to deflocculate or stabilize dispersed systems of solid particles. Our novel compounds possess, to a measurable extent, these desirable properties. The effectiveness of our compounds in this respect is further discussed in connection with the standard and commercial detergent evaluation tests which appear in the examples that follow.

Our invention is further illustrated by the following examples.

EXAMPLE I

*N-urea glucoside*

N-urea glucoside was prepared in the following manner, generally in accordance with the teachings in British Patent No. 653,775 (1951). A 1,020 g. (5.2 moles) portion of glucose hydrate was added to 300 ml. of water and heated to 60° C. with constant stirring. To this solution 3,400 g. (56.8 moles) of urea were added. An additional 9,180 g. (46.4 moles) of glucose hydrate was added in kilogram portions to the milky dispersion. To this mixture 165 ml. of 98% sulfuric acid in 300 ml. of water were added. Agitation was continued for 8 hours and during this time the temperature was maintained at 60° C. Upon subsequent cooling, the mixture solidified. Sufficient water (17.6 liters) was added to dissolve the mass. The solution was diluted with with 52.8 liters of methanol. Upon standing overnight a precipitate formed which was separated from the solution by filtration, washed with fresh methanol and dried. The N-urea glucoside thus obtained was a white powder with a specific rotation $$[\alpha]\frac{25° \text{ C.}}{D} = -23°$$

in aqueous solution. It melted at 210° C. In general, yields ranging from 80 to 90 weight percent of theory were obtained by the procedure described hereabove.

EXAMPLE II

*N-urea glucoside myristate*

A reaction apparatus was assembled by equipping a 3-necked flask with a stirrer and a ten-bulb fractionating column leading to a receiver. This flask was charged with 1.5 liters of dimethylsulfoxide, 333 g. (1.5 moles) of N-urea glucoside (obtained by the procedure of Example I), 121 g. (0.5 mole) of methyl myristate, and 7 g. of potassium carbonate catalyst. The solution was heated to 90° C. under reduced pressure (15 mm. Hg) for 15 hours. The ten-bulb fractionating column permitted a partial fractionation of the distillate, which contained methanol and dimethylsulfoxide. A total of 600 ml. of distillate was collected during the entire period of the reaction. The reaction solution was cooled and the unreacted N-urea glucoside was recovered by filtration. To the clear filtrate were added 6.2 g. of acetic acid. This amount was just sufficient to neutralize any remaining potassium carbonate and convert any potassium soap formed to the free acid. The filtrate was mixed with 1 liter of butanol and 1 liter of concentrated aqueous NaCl solution. The resulting mixture was agitated in a separatory funnel, and the mixture was allowed to separate. The upper butanol layer (which contained the product) was separated and washed with 100 ml. of fresh NaCl solution. The washed butanol layer was decolorized with activated charcoal, then distilled in vacuo to a thick syrup. This syrup was then dissolved in 500 ml. of boiling ethanol. As the ethanol solution cooled, 21 g. of product separated. This was filtered and the filtrate was mixed with 1 liter of acetone. The resulting solution was chilled to −10° C. to precipitate a second portion of product weighing 81 g.

The novel product was purified by adsorption chromatography according to the procedure set forth in the specification, supra. It melted at 165–168° C. and had a specific rotation $$[\alpha]\frac{22°\ C.}{D} = +12.9°$$

in dimethyl sulfoxide. A sample was analyzed and the composition checked with theory as follows: percent carbon, theory 58.3, found 57.3; percent hydrogen, theory 9.26, found 9.35; percent oxygen, theory 25.9, found 26.02; and percent nitrogen, theory 6.48, found 6.31. The structural formula of N-urea glucoside myristate is shown hereunder:

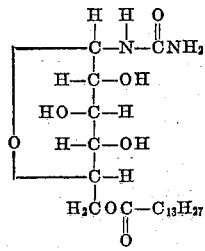

EXAMPLE III

N-urea glucoside laurate

N-urea glucoside was prepared by the procedure of Example I. A 222 g. (1 mole) portion of this material was dissolved in 1.5 liters of dimethylsulfoxide containing 110 g. (0.5 mole) of methyl laurate. This solution was heated to 90° C. under reduced pressure (30 mm. Hg absolute) for one hour to remove any moisture that might has been present. The reaction flask was then equipped with a ten plate fractionating column. A 7 g. portion of anhydrous potassium carbonate was added as a catalyst and the solution was heated to 90° C. under 30 mm. Hg absolute pressure for 10 hours. Vapors passed through the fractionating column before reaching the receiver. The purpose of the fractionating column was to effect a partial separation of the methanol from the dimethylsulfoxide, as indicated in Example II. At the end of the reaction 400–500 milliliters of distillate had been collected. The reaction solution was cooled, neutralized with glacial acetic acid, and diluted with equal volumes of butanol and NaCl solution. The upper butanol layer, after separation, was washed with a small quantity of fresh NaCl solution. The butanol layer was decolorized with activated carbon, dried over anhydrous sodium sulfate and distilled to a syrupy residue. This syrup was dissolved in 500 ml. of ethanol; the solution was diluted with 500 ml. of acetone, and the resulting solution was chilled to −15° C. The chilled solution was filtered to give 87 g. of N-urea glucoside laurate. The filtrate was concentrated to one-half its volume and rechilled to give 58 g. of a crude product, which was apparently composed of a mixture of mono- and di-esters. The first fraction of 87 g. was recrystallized from fresh ethanol-acetone mixture to give 61 g. of purified N-urea glucoside laurate.

The novel product was further purified by adsorption chromatography. It had a melting point of 170–171° C., and a specific rotation $$[\alpha]\frac{22°\ C.}{D} = +13.3°$$

in dimethyl sulfoxide. Upon analysis it was found to have the following composition as compared with theory: percent carbon, theory 56.5, found 56.34; percent hydrogen, theory 8.9, found 8.86; percent oxygen, theory 27.7, found 27.55; and percent nitrogen, theory 6.95, found 7.16.

EXAMPLE IV

N-urea glucoside laurate

N-urea glucoside laurate was also prepared according to the following alternate procedure, in which the N-urea glucoside reactant is added in two portions. 110 g. (0.5 mole) of N-urea glucoside, 110 g. (0.5 mole) of methyl laurate and 7 g. of potassium carbonate were dissolved in 1.5 liters of dimethylsulfoxide at 90° C. The solution was subjected to an absolute pressure of 50 mm. Hg and the distillate was passed through a ten plate distilling column. Fractionation was carried out at 90° C. and 50 mm. Hg for 6 hours. A 110 g. portion of N-urea glucoside was then added to the reaction solution and heating at 90° C. was continued for an additional 8 hours at atmospheric pressure. The dimethylsulfoxide solution was neutralized with glacial acetic acid. This solution was mixed with equal volumes of butanol and NaCl solution. The butanol layer that separated was washed once with fresh NaCl solution. The butanol solution was then decolorized with activated carbon, dried over anhydrous sodium sulfate, and distilled to dryness. The resulting residue was taken up in 800 ml. of ethanol. The solution was subsequently diluted with 800 ml. of acetone and the combined mixture was cooled to −15° C. The precipitate that formed was filtered to give 80 g. of dried product. One recrystallization of this product with fresh ethanol-acetone mixture gave 70 g. of N-urea glucoside laurate. From the ethanol-acetone filtrate a 45 g. portion of N-urea glucoside laurate esters also was obtained. Saponification data suggested that this second fraction was a mixture of mono-, di-, and higher substituted esters.

EXAMPLE V

N-urea glucoside palmitate

The procedure of Example II was substantially repated using 135 g. (0.5 mole) of methyl palmitate. An 81 g. yield of N-urea glucoside palmitate was thereby obtained. After purification by adsorption chromatography the novel product was found to have a melting point of 150–162° C. and a specific rotation $$[\alpha]\frac{22°\ C.}{D} = +7.44°$$

in dimethyl sulfoxide. Upon analysis the following results were obtained: percent carbon, theory 60.0, found 61.28; percent hydrogen, theory 9.56, found 9.95; percent oxygen, theory 24.3, found 23.26; and percent nitrogen, theory 6.08, found 5.34.

EXAMPLE VI

N-urea glucoside cocoate

The procedure of Example II was substantially repeated using 130 g. (0.5 mole) of methyl "cocoate." A 68 g. yield of the novel N-urea glucoside cocoate was thereby obtained. This new product was analyzed without purification and was found to contain 5% nitrogen (theory 6.45) and 51.6% fatty acid equivalent (theory 53%). The methyl "cocoate" comprises methyl esters of coconut oil fatty acid containing about 0.8% caproate, 5.4% caprylate, 8.4% caprate, 45.4% laurate, 18.0% myristate, 10.5% palmitate, 2.3% stearate, 0.4% arachidate, 7.5% oleate, and 0.4% palmitoleate. See Bailey, Industrial Oil and Fat Products, second edit., p. 135 (1951).

EXAMPLE VII

N-urea glucoside tallowate

The procedure of Example II was substantantially repeated using 141 g. of methyl "tallowate" in lieu of the myristate. 81 g. of crude N-urea glucoside tallowate, specific rotation $$[\alpha]\frac{22° \text{ C.}}{D} = +15.1°$$

in dimethyl sulfoxide were thereby obtained. The crude material had a nitrogen content of 4.92% (theory 5.9%) and a fatty acid equivalent content of 61.8% (theory 57.0%). It was purified by adsorption chromatography and thereafter characterized by analysis. The "tallowate" is a mixture of tallow fatty acid methyl esters containing about 6.3% myristate, 27.4% palmitate, 14.1% stearate, 49.6% oleate, and 2.5% octadecadienoate. See Bailey, Industrial Oil and Fat Products, p. 147 supra.

EXAMPLE VIII

*N-urea glucoside oleate*

The procedure of Example II was substantially repeated using 150 g. of methyl oleate in lieu of the myristate. A 92 g. portion of N-urea glucoside oleate was thereby obtained. This material has a specific rotation of $$[\alpha]\frac{25° \text{ C.}}{D} = +8.5°$$

It was purified by adsorption chromatography and thereafter characterized. The pure product melted at 122-128° C. and had a specific rotation $$[\alpha]\frac{22° \text{ C.}}{D} = +6.63°$$

in dimethyl sulfoxide. The purified N-urea glucoside oleate had the following composition: percent carbon, theory 61.72, found 59.45; percent hydrogen, theory 9.46, found 8.6; percent oxygen, theory 23.0, found 26.8; and percent nitrogen, theory 5.76, found 5.38.

EXAMPLE IX

*N-urea glucoside stearate*

By following the procedure of Example II, 100 g. of methyl stearate were converted to 71 g. of crude N-urea glucoside stearate. The fraction from ethanol weighed 40 g. with a specific rotation $$[\alpha]\frac{22° \text{ C.}}{D} = +19.8°$$

The 31 g. fraction from acetone had a specific rotation of $$[\alpha]\frac{22° \text{ C.}}{D} = +16.4°$$

The combined product was purified by adsorption chromatography. The purified material had the following composition: percent carbon, theory 61.47, found 59.74; percent hydrogen, theory 9.83, found 9.36; percent oxygen, theory 22.5, found 24.2; and percent nitrogen, theory 5.63, found 5.37. It melted a 154-160° C. and had a specific rotation of $$[\alpha]\frac{22° \text{ C.}}{D} = +13.3°$$

in dimethyl sulfoxide.

EXAMPLE X

*Detergency evaluation*

The N-urea glucoside monofatty esters are effective as cleaning agents per se. They also function quite suitably when built for both heavy and light duty detergency. It has previously been indicated that detergency depends upon a variety of factors; viz: wetting power, emulsification, dispersion and deflocculation. The following experiment was conducted to compare built detergents of various types using the novel N-urea glucoside esters.

A sample of "Foster D. Snell" soiled cotton was selected for the evaluation of the heavy duty detergents. This test sample was prepared by treating de-sized Indian Head cotton fabric in a soiling mixture containing 28.4% carbon, 35.8% coconut oil, 17.9% coconut oil fatty acids and 17.9% mineral oil suspended in carbon tetrachloride. The Indian Head cotton fabric was dipped into the suspension, air dried, rinsed lightly in water to remove loosely adherent soil. It was again air dried. A test sample of Foster D. Snell soiled wool, selected for evaluation of the light duty detergents, was prepared as follows: Sheets of Botany Mills virgin wool were scoured in a washing machine at 430 C. for 15 minutes using an aqueous solution of a commercial detergent. The wool was thereafter rinsed, using three changes of water with constant agitation for 15 minutes at 43° C. for each change. A standard soiling mixture was prepared by homogenizing 17 g. of a standard soil (comprising 7.3 parts coconut oil fatty acids, 146 parts of coconut oil, 146 parts of deflocculated graphite and 1.1 parts of commercial detergent) in 50 ml. of water. The soil emulsion was dispersed in 3 liters of water; it was then added to a washing machine containing 23 sheets of the scoured rinsed wool and 10 gallons of water at 43° C. Ten minutes after the soil was added the machine was stopped and the water was allowed to drain off. The soiled wool was rinsed once for 5 minutes with 10 gallons of water at 43° C. and then hung up to dry in a dust-free room. The composition of the built detergents is shown in Table 1.

TABLE 1.—COMPOSITION OF BUILT DETERGENTS

|  | Type of Building | |
|---|---|---|
|  | A, percent | B, percent |
| Active agent | 20.0 | 25.0 |
| Sodium tripolyphosphate | 40.0 | |
| Tetrasodium pyrophosphate | 10.0 | |
| Sodium metasilicate pentahydrate | 10.0 | |
| Sodium sulfate | 19.5 | 75.0 |
| Sodium carboxymethylcellulose | 0.5 | |

Detergents were compared by running simultaneous wash tests in a standard laboratory detergency testing machine, e.g., a Launderometer. This machine rotates twenty jars end-over-end in a bath of fixed temperature. In each jar are placed standard soiled cloths, wash solution and rubber balls to provide "load." The test method gives useful comparative results provided, of course, that the detergents to be compared are run simultaneously and portions of the same batch of standard cloth are used. For check runs, the same series is repeated a second time and a third time. The values for each detergent can be averaged and incidental variables will largely cancel out when the averages are compared. Such a system is called a group experiment. The test conditions used with heavy duty detergents are shown below in Table 2.

TABLE 2.—TEST CONDITIONS

| | |
|---|---|
| Amount of solution per jar | 100 mill. |
| Mechanical washing assistants | 8 rubber balls ⅜" dia. |
| Temperature | 60° C. |
| Speed of rotation of jars | 40 r.p.m. |
| Time for washing | 15 minutes. |
| Rinsing procedure | Rotate two minutes with 150 ml. water of same hardness as wash water |
| Fabrics per jar | Two swatches of "FDS" soiled cotton 3 x 2 inches. |
| Reflectance reading | By a standard reflectancemeter, e.g., a Hunter Multipurpose Reflectometer set to read 100 on magnesia block. |

Detergents for light duty were tested using the above procedure substituting "FDS" soiled wool for the cotton and reducing the temperature to 43° C.

The esters of N-urea glucoside were compared with a polyoxyethylene ester of tall oil, a nonionic detergent sold commercially as "Sterox CD," which is commonly built for heavy duty household uses. Detergency data were obtained in both hard water of a hardness equivalent to 15 grains of calcium carbonate per gallon and soft water of a hardness equivalent to 2 grains per gallon. A U.S. grain of hardness is equivalent to 17.1 parts per million of calcium carbonate. Results for both heavy duty and light duty detergency evaluation appear below in Tables 3 and 4.

TABLE 3.—HEAVY DUTY DETERGENCY EVALUATION

[Soiled cotton washed at 60° C.]

| Active Agent | Type of Build-ing | Gain in Reflectance Units of Soiled Fabrics after Washing in Launderometer | | | |
|---|---|---|---|---|---|
| | | 2-Grain Water, Detergent Concentration | | 15-Grain Water, Detergent Concentration | |
| | | 0.25% | 0.35% | 0.25% | 0.35% |
| N-urea glucoside laurate | A | 9.7 | 14.8 | 6.6 | 12.2 |
| N-urea glucoside myristate | A | 4.5 | 9.3 | 3.8 | 5.8 |
| N-urea glucoside cocoate | A | 8.3 | 11.4 | 5.6 | 8.8 |
| N-urea glucoside palmitate | A | 5.1 | 5.8 | 4.5 | 4.6 |
| N-urea glucoside stearate | A | 5.0 | 7.9 | | 5.5 |
| N-urea glucoside tallowate | A | 4.8 | 6.0 | 4.1 | 4.5 |
| Polyoxyethylene ester of tall oil | A | 2.5 | 4.4 | 3.8 | 3.5 |

TABLE 4.—LIGHT DUTY DETERGENCY EVALUATION

[Soiled wool washed at 43° C.]

| Active Agent | Type of Build-ing | Gain in Reflectance Units of Soiled Fabrics after Washing in Launderometer | |
|---|---|---|---|
| | | 2-Grain Water, Detergent Concentration, 0.3% | 15-Grain Water, Detergent Concentration, 0.3% |
| N-urea glucoside laurate | B | 5.3 | 3.0 |
| N-urea glucoside myristate | B | 12.9 | 13.1 |
| N-urea glucoside cocoate | B | 7.5 | 5.9 |
| N-urea glucoside palmitate | B | 9.8 | 7.7 |
| N-urea glucoside stearate | B | 7.3 | 5.5 |
| N-urea glucoside tallowate | B | 3.6 | 1.9 |
| Polyoxyethylene ester of tall oil | B | 3.2 | 2.8 |

It is readily seen from the tables hereabove that the N-urea glucoside fatty acid esters are superior to the commercial detergent tested when built for both light and heavy duty detergency. In fact, the N-urea glucoside laurate appears to be an especially effective heavy duty detergent. For light duty, the N-urea glucoside myristate is exceptional among the compounds tested. The synergistic effect obtained by combining our novel compounds with detergent builders is fully discussed in our copending application S.N. 663,581, filed June 5, 1957.

EXAMPLE XI

*Detergency evaluation*

To test the effectiveness of the novel N-urea glucoside monofatty esters as unbuilt detergents, large soiled glass wickings were washed with these detergents in a Launderometer. The soiled wicks were prepared by dipping 1½″ x 4″ strips of resin-free glass wicking in a bath of 10% lard, dissolved in petroleum ether. The treating bath contained a trace of Oil Red O dye. The swatches were allowed to air dry and were stored overnight in a refrigerator until ready to be washed.

200 ml. of the test detergent solutions were preheated to 43° C. These solutions (about 0.1% concentration in each case) were placed in quart mason jars, each containing a soiled glass wick. Duplicate jars were prepared for each detergent in 2-grain water. The jars were sealed and rotated in a Launderometer (preheated to 43° C.) for 15 minutes at 40 revolutions per minute. One water (blank) sample was included containing 2-grain water and a soiled glass wick. At the end of the wash period the wicks were removed and hand-rinsed in 2 gallons of water at 43° C.

The washed wicks were dried at room temperature for 24 hours and then hexane extracted to recover the lard remaining in the wicks. Table 5 below reports the percent lard remaining in each wick based on the amount of lard originally present in the wick.

TABLE 5.—PERCENT LARD REMAINING IN WASHED GLASS WICKING

| Detergent | Average of Duplicate Wicks — Percent Lard in Wick after Scouring at 43° C. with 0.1% Detergent Solution (Determined by Hexane Extraction of Washed Wick) |
|---|---|
| N-urea glucoside laurate | 45 |
| N-urea glucoside cocoate | 53 |
| N-urea glucoside myristate | 48 |
| Polyoxyethylene ester of tall oil | 51 |
| Water (blank) | 90 |

The results of Table 5 clearly show that the N-urea glucoside monofatty esters are comparable or superior to a standard commercial nonionic detergent. The test conclusively shows that these novel compounds are useful as cleaning agents per se.

EXAMPLE XII

*Emulsification*

Since the compounds of the present invention are effective both as built and unbuilt detergents, it is apparent that they have some emulsification properties. The following test was conducted to determine the nature and extent of these properties. 10 ml. of heavy mineral oil ("Kaydol") containing an oil soluble dye and 100 ml. of detergent solution were placed in a laboratory model hand homogenizer and homogenized twice. The solution was transferred to a 100 ml. Nessler tube and the height of the clear layer was measured in mm. after various intervals of time. The test was repeated substituting cottonseed oil for the heavy mineral oil. Results appear in Tables 6 and 7 below.

TABLE 6.—EMULSIFICATION

[10 ml. heavy mineral oil (Kaydol)+100 ml. 0.1% detergent solution.]

| Detergent | Height in Millimeters, Clear Layer | | | |
|---|---|---|---|---|
| | Time in Hours | | | |
| | 2 | 18 | 32 | 96 |
| N-urea glucoside myristate | 0 | 0 | 0 | 0 |
| Polyoxyethylene ester of tall oil | 1 | 1 | 1 | 2 |
| t-Octylphenol polyether alcohol | 0 | 0 | 0 | 0 |

TABLE 7.—EMULSIFICATION

[10 ml. cottonseed oil+100 ml. 0.1% detergent solution.]

| Detergent | Height in Millimeters, Clear Layer | | | |
|---|---|---|---|---|
| | Time in Hours | | | |
| | 2 | 18 | 32 | 96 |
| N-urea glucoside myristate | 0 | 0 | 0 | 0 |
| Polyoxyethylene ester of tall oil | 1 | 1 | 1 | 1 |
| t-Octylphenol polyether alcohol | 0 | 0 | 0 | 0 |

The data indicate that N-urea glucoside myristate is a good emulsifier, comparable in respect to this important property to the polyoxyethylene ester of tall oil and the t-octylphenol polyether alcohol. These latter compounds are commercial detergents primarily sold in the United States under the names of "Sterox CD" and "Triton X–100" respectively.

It is obvious that the data shown in Tables 6 and 7 are merely illustrative of the emulsification potential of the novel compounds of the present invention. Effective emulsification is predicated on several factors. Emulsification is an important property since it is closely related to the prevention of redeposition of soil on the clean fabric. During the washing process the soil particles must be thoroughly dispersed through the detergent solution and then held apart until they are carried away from the presence of the fabric. Effective emulsificants, such as the compounds of the present invention, tend to form a film around the surface of the soil particle. The individual coated particles form a stable emulsion containing the soil which can be successfully carried away from the surface of the clean fabric.

hold uses and reduce the ultimate cost to the consumer. The compounds of the present invention not only form by themselves a stable foam, but they have the capacity of increasing the foam stability of other foaming agents in the presence of soil. (Compare Example XIV.)

Foam capacity and stability in the absence of soil was measured at 43° C. by the Ross and Miles foam test. (Oil and Soap, 5, 99–102 [1941]). This test consists essentially of running 200 ml. of solution through a standard orifice into a water jacketed cylinder which contains 50 ml. of the same solution. The height of the column of foam separated is measured immediately and again after 1, 5 and 10 minute periods have elapsed. Evaluations were made using 2- and 15-grain water at 0.1, 0.2 and 0.4% detergent concentration. Results are shown in Table 8.

TABLE 8.—ROSS AND MILES FOAM TEST AT 43° C.

| Detergent | 2-Grain Water with 0.1, 0.2, and 0.4% Detergent Concentrations [Foam Height in cm. after Indicated Time in Minutes.] | | | | | | | | | | | |
|---|---|---|---|---|---|---|---|---|---|---|---|---|
| | 0.1% | | | | 0.2% | | | | 0.4% | | | |
| | 0 Min. | 1 Min. | 5 Min. | 10 Min. | 0 Min. | 1 Min. | 5 Min. | 10 Min. | 0 Min. | 1 Min. | 5 Min. | 10 Min. |
| N-urea glucoside laurate | 3.0 | 3.0 | 3.0 | 3.0 | 4.5 | 4.5 | 4.0 | 3.5 | 5.0 | 5.0 | 4.5 | 4.5 |
| N-urea glucoside myristate | 3.0 | 2.5 | 2.0 | 2.0 | 3.5 | 3.5 | 3.0 | 3.0 | 2.0 | 2.0 | 2.0 | 2.0 |
| N-urea glucoside cocoate | 1.0 | 1.0 | 1.0 | 1.0 | 2.0 | 2.0 | 2.0 | 2.0 | 3.0 | 3.0 | 3.0 | 2.5 |
| N-urea glucoside stearate | 2.0 | 1.5 | 1.5 | 1.5 | 2.0 | 2.0 | 2.0 | 1.5 | 2.5 | 2.0 | 2.0 | 2.0 |
| N-urea glucoside palmitate | 1.5 | 1.5 | 1.5 | 1.5 | 2.0 | 2.0 | 2.0 | 2.0 | 2.0 | 2.0 | 2.0 | 2.0 |
| N-urea glucoside tallowate | 2.0 | 2.0 | 2.0 | 2.0 | 3.0 | 3.0 | 2.5 | 2.5 | 3.5 | 3.0 | 3.0 | 3.0 |
| | 15-Grain Water with 0.1, 0.2, and 0.4% Detergent Concentrations | | | | | | | | | | | |
| N-urea glucoside laurate | 3.5 | 3.0 | 3.0 | 3.0 | 4.5 | 4.5 | 4.0 | 4.0 | 5.0 | 4.5 | 4.5 | 4.5 |
| N-urea glucoside myristate | 2.0 | 2.0 | 2.0 | 2.0 | 3.0 | 2.5 | 2.5 | 2.0 | 2.0 | 2.0 | 2.0 | 2.0 |
| N-urea glucoside cocoate | 1.5 | 1.5 | 1.5 | 1.5 | 3.0 | 3.0 | 2.5 | 2.5 | 3.0 | 3.0 | 3.0 | 2.5 |
| N-urea glucoside stearate | 1.5 | 1.5 | 1.0 | 1.0 | 2.0 | 2.0 | 1.5 | 1.5 | 2.0 | 2.0 | 2.0 | 2.0 |
| N-urea glucoside palmitate | 1.5 | 1.5 | 1.0 | 1.0 | 2.0 | 2.0 | 2.0 | 2.0 | 2.0 | 2.0 | 2.0 | 2.0 |
| N-urea glucoside tallowate | 2.0 | 2.0 | 2.0 | 2.0 | 2.5 | 2.5 | 2.5 | 2.5 | 3.0 | 3.0 | 2.5 | 2.5 |

The data in Table 8 indicate that the N-urea glucoside esters are good low foamers. They are comparable in this respect to standard commercial non-ionic detergents.

EXAMPLE XIII

*Foaming*

Foam capacity and stability possessed by detergents are subject to a variety of practical and esthetic considerations. Surface activity, degree of dispersion, and viscosity are factors which determine the nature of the foaming properties of a particular substance. Low and stable foams are desirable in that they may effect some flotation of solid material by preferential adsorption of the solid in the bubble film. This desirable result depends upon selective wetting whereby the surface film will wet and hold solid particles more strongly than the main body of the solution. The solid particles will rise with the bubble and be held in the foam. They will be thus carried away from the cleaned fabric. In automatic washing machines high foam is not particularly desirable since it increases the mechanical load or drag upon the machine. However, in manual dishwashing, high foam is an important psychological factor. The typical housewife uses a foam as an empirical yardstick indicating that there is sufficient detergent in the wash water. Therefore, although most synthetic detergents continue to clean effectively even after they have stopped producing foam, the presence of stable foam serves to "extend" the detergent in house-

EXAMPLE XIV

*Suds stability*

Suds stability in the presence of food soil was evaluated by a manual dishwashing test. The test procedure involved the washing of soiled dishes until the foam no longer completely covered the surface of the solution. The number of dishes and the time required to the foam endpoint were recorded. The method of preparation of the soiled dishes and the test procedure were as follows:

Porcelain dinner plates were smeared with one-half teaspoon per plate of a melted oil consisting of 80% hydrogenated cottonseed oil (Crisco), 20% flour and enough deflocculated Acheson graphite (Oildag) for a distinctive dirty coloring. The soiled plates were placed in racks and aged for 24 hours at room temperature. Four grams of detergent were placed on the bottom of a dishpan (12 cm. deep, 36 cm. bottom diameter, 38 cm. top diameter). One liter of 2-grain water at 45° C. was added thereto to dissolve the test detergent. An additional 3 liters of water at 45° C. were poured into the dishpan through a ½ gallon glass funnel from a height of 30 inches directly above the center of the dishpan. The funnel was partially filled with small ground glass stoppers to control the rate of water flow. After 30 seconds, the soiled dishes were individually washed with a dishrag until clean. Additional dishes were washed until the foam disappeared. The results of these tests appear in Table 9 below.

TABLE 9.—MANUAL DISHWAHING TEST

[0.1% active agent in 2-grain water at 43° C.]

| Active agent | Number of Dishes Washed at Foam End Point |
|---|---|
| Sodium keryl benzene sulfonate, 0.10% | 10 |
| Sodium keryl benzene sulfonate, 0.075%+N-urea glucoside laurate, 0.025% | 14 |
| Sodium keryl benzene sulfonate, 0.075%+N-urea glucoside myristate, 0.025% | 13 |
| Sodium keryl benzene sulfonate, 0.075%+N-urea glucoside cocoate, 0.025% | 11 |
| t-Octylphenol polyether alcohol, 0.10% | 10 |
| t-Octylphenol polyether alcohol, 0.075%+N-urea glucoside laurate, 0.025% | 16 |
| t-Octylphenol polyether alcohol, 0.075%+N-urea glucoside myristate, 0.025% | 14 |
| t-Octylphenol polyether alcohol, 0.075%+N-urea glucoside cocoate, 0.025% | 13 |
| Sodium N-methyl-N-oleoyl taurate, 0.10% | 10 |
| Sodium N-methyl-N-oleoyl taurate, 0.075%+N-urea glucoside laurate, 0.025% | 13 |
| Sodium N-methyl-N-oleoyl taurate, 0.075%+N-urea glucoside myristate, 0.025% | 15 |
| Sodium N-methyl-N-oleoyl taurate, 0.075%+N-urea glucoside cocoate, 0.025% | 14 |

The results of this test clearly show that a small quantity of one of the novel compounds of the present invention can be added to commercial detergents to form detergent compositions having enhanced suds stability.

In summary, our novel compounds are effective cleaning agents, either by themselves or in the presence of a builder. They are capable of forming stable emulsions which enhances their ability to carry away soil from the surface of a fabric without redeposition. They form low and stable foams. They show a synergistic effect when combined with standard commercial anionic and nonionic detergents with respect to foaming properties. The foam formed by these novel combinations of the N-urea glucoside esters and standard commercial detergents is more stable than that formed by either substituent when used alone.

Our novel compounds are non-substantive to textiles. They are compatible with both anionic and nonionic agents and are noninjurious if left on the surface of the fabric being treated. In addition to their important use as retail detergents, our new N-urea glucoside esters are useful in general textile, cosmetic and pharmaceutical applications.

We claim:

1. New chemical compounds having the general formula:

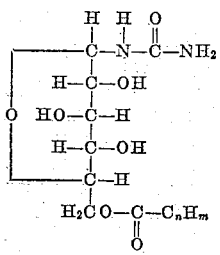

wherein $n$ is an integer having the value of at least 7 and not more than 23 and $m$ is an integer having a value between $2n-3$ and $2n+1$ inclusive.

2. Compounds according to claim 1 wherein $m$ has the value of $2n-1$.

3. Compounds according to claim 1 wherein $m$ has the value of $2n+1$.

4. As a new chemical compound, N-urea glucoside mono-laurate.

5. As a new chemical compound, N-urea glucoside mono-myristate.

6. As a new chemical compound, N-urea glucoside mono-palmitate.

7. As a new chemical compound, N-urea glucoside mono-stearate.

8. As a new chemical compound, N-urea glucoside mono-oleate.

9. A process for preparing fatty acid monoesters of N-urea glucoside comprising contacting N-urea glucoside with an ester having the formula:

$$C_nH_mC\begin{matrix}\diagup O \\ \diagdown OR'\end{matrix}$$

wherein $n$ is an integer having the value of at least 7 and not more than 23, $m$ is an integer having a value between $2n-3$ and $2n+1$ inclusive and $R'$ is a lower alkyl radical in mutual unreactive solvent in the presence of an alkaline catalyst.

10. A process according to claim 9 wherein $m$ is $2n+1$.

11. A process according to claim 10 in which the starting ester is an ester of lauric acid, whereby N-urea glucoside mono-laurate is formed.

12. A process according to claim 10 in which the starting ester is an ester of myristic acid, whereby N-urea glucoside mono-myristate is formed.

13. A process according to claim 10 in which the starting ester is an ester of palmitic acid, whereby N-urea glucoside mono-palmitate is formed.

14. A process according to claim 10 in which the starting ester is an ester of stearic acid, whereby N-urea glucoside mono-stearate is formed.

15. A process according to claim 9 in which the starting ester is an ester of oleic acid, whereby N-urea glucoside mono-oleate is formed.

16. A process according to claim 9 in which the reaction mixture is heated under reduced pressure, whereby at least a portion of the by-product alcohol is distilled off.

17. A process according to claim 16 in which the reaction mixture is heated under a reduced pressure of 5–50 mm. Hg absolute at a temperature in the range of about 60–95° C., and a monoester of N-urea glucoside is recovered from the residue.

18. A process according to claim 17 in which the mole ratio of N-urea glucoside to ester is about 3:1.

19. A process according to claim 9 in which the solvent is selected from the group consisting of dimethylsulfoxide, formamide and monomethylformamide.

20. A process according to claim 9 in which the catalyst is selected from the group consisting of alkali metal carbonates, alkali metal hydroxides, alkali metal alcoholates, alkali metal phosphates and alkaline earth metal hydroxides.

References Cited in the file of this patent

UNITED STATES PATENTS

| 2,612,497 | Meijer | Sept. 30, 1952 |
| 2,738,333 | Goldsmith | Mar. 13, 1956 |

FOREIGN PATENTS

| 496,832 | Canada | Oct. 13, 1953 |

OTHER REFERENCES

Pigman: Carbohydrate Chemistry, 1948, Academic Press, New York, N.Y., p. 381.

UNITED STATES PATENT OFFICE
CERTIFICATE OF CORRECTION

Patent No. 2,903,446                                            September 8, 1959

Lloyd I. Osipow et al

It is hereby certified that error appears in the printed specification of the above numbered patent requiring correction and that the said Letters Patent should read as corrected below.

Column 2, line 29, for "nondecanoate" read -- nonadecanoate --; lines 67 to 69, lower right-hand portion of Equation 1, for "$H_2CO-C$" read $$-- H_2CO-\underset{\underset{O}{\|}}{C}-R --;$$

column 7, line 67, for "170-171° C." read -- 170-176° C. --; column 8, line 39, for "repated" read -- repeated --; column 10, line 10, for "430 C." read -- 43° C. --; line 56, for "100 mill." read -- 100 ml. --.

Signed and sealed this 22nd day of March 1960.

(SEAL)

Attest:

KARL H. AXLINE                                                    ROBERT C. WATSON

Attesting Officer                                                Commissioner of Patents